US009757646B2

(12) United States Patent
Dumitrescu et al.

(10) Patent No.: US 9,757,646 B2
(45) Date of Patent: Sep. 12, 2017

(54) SELECTING OBJECTS ON A USER INTERFACE BASED ON ANGLE OF TRAJECTORY OF USER INPUT

(71) Applicant: KING.COM LIMITED, St. Julians (MT)

(72) Inventors: Adrian Catalin Dumitrescu, Bucharest (RO); Virgiliu Ionescu, Bucharest (RO)

(73) Assignee: KING.COM LTD., St. Julians (MT)

( * ) Notice: Subject to any disclaimer, the term of this patent is extended or adjusted under 35 U.S.C. 154(b) by 187 days.

(21) Appl. No.: 14/270,717

(22) Filed: May 6, 2014

(65) Prior Publication Data

US 2015/0321087 A1    Nov. 12, 2015

(51) Int. Cl.
| | |
|---|---|
| A63F 9/24 | (2006.01) |
| A63F 13/2145 | (2014.01) |
| A63F 3/04 | (2006.01) |
| G06F 3/0488 | (2013.01) |
| A63F 13/42 | (2014.01) |
| A63F 13/426 | (2014.01) |

(52) U.S. Cl.
CPC ........ *A63F 13/2145* (2014.09); *A63F 3/0421* (2013.01); *A63F 13/42* (2014.09); *A63F 13/426* (2014.09); *G06F 3/0488* (2013.01)

(58) Field of Classification Search
CPC ........ A63F 13/00; A63F 13/10; A63F 13/005; A63F 13/2145; A63F 13/42; A63F 13/537; A63F 13/573; A63F 13/40; A63F 13/426; A63F 13/45; A63F 13/52; A63F 13/55; A63F 13/56; A63F 13/57; A63F 13/577; A63F 2300/65; A63F 3/00; A63F 3/00643; G06F 3/0488
See application file for complete search history.

(56) References Cited

U.S. PATENT DOCUMENTS

| | | | |
|---|---|---|---|
| 2004/0104896 A1 | 6/2004 | Suraqui | |
| 2011/0210850 A1* | 9/2011 | Tran | G06F 3/04883 340/540 |
| 2014/0015753 A1 | 1/2014 | Pai | |

OTHER PUBLICATIONS

"Word Streak with Friends", Mar. 23, 2012, Wikipedia, <https://en.wikipedia.org/w/index.php?title=Word_Streak_with_Friends&oldid=483459483>.*

(Continued)

*Primary Examiner* — Justin Myhr
(74) *Attorney, Agent, or Firm* — Saul Ewing LLP (57) ABSTRACT

In an embodiment there is provided a device having a touch user interface configured to display a game board having a plurality of selectable game objects comprising tiles stored in at least one memory and displayed in a configuration on said game board, each game object having a boundary defined on the user interface, said user interface being configured to receive user input, and at least one processor in connection or communication with the at least one memory and the user interface and configured to detect a selection of a game object in response to touch user input within the game object boundary, detect a trajectory of the user input towards neighboring game objects, determine an angle of said trajectory with respect to an axis of the game board, and select at least one of the neighboring game objects in dependence on said trajectory and determined angle. The angle may be determined by comparison with predefined angular regions corresponding a game object or tile configuration.

25 Claims, 7 Drawing Sheets

(56) References Cited

OTHER PUBLICATIONS

"Boogie Free", Mar. 7, 2013, Andriod, <https://web.archive.org/web/20130307131541/http://www.ea.com/boggle-free-android>.*

Christine Chan, "Letris Power Brings Fancy New Power-Ups to the Word-Tetris Hybrid Game",Mar. 15, 2012, appadvice.com, <https://web.archive.org/web/20120317120459/http://appadvice.com/appnn/2012/03/quickadvice-letrispower>.*

Boogie APP for Iphone, <https://www.youtube.com/watch?v=tmnZHCwF90U> uploaded Jul. 3, 2010, <https://web.archive.org/web/20120406152508/http://touchreviews.net/boggle-iphone-game-review-puzzle/> posted on Sep. 5, 2009.*

International Search Report, dated Aug. 10, 2015, and Written Opinion, issued in corresponding International Application No. PCT/EP2015/059952.

Anonymous: "Swype—Wikipedia, the free encyclopedia," retrieved from the Internet: URL:https://en.wikipedia.org/w/index.php?title=Swype&oldid=606152921 [retrieved on Jul. 31, 2015] (Apr. 28, 2014) XP055205718.

Adam Jones Producions, Inc., "Word Drop", https://web.archive.org/web/20120424125850/http://www.mindjolt.com/word-drop.html, Apr. 24, 2012.

\* cited by examiner

SELECTING OBJECTS ON A USER INTERFACE BASED ON ANGLE OF TRAJECTORY OF USER INPUT

FIELD OF THE INVENTION

This invention relates to selecting objects on a user interface. It is providing but not exclusively directed to controlling a user interface responsive to user engagement with displayed game objects on the interface of a computer device.

Some embodiments may relate to devices having a user interface for engaging users or players in a computer game executable in an online environment.

BACKGROUND OF THE INVENTION

There exists many types of computer device where the user interface is controlled by touch. That is, activation of functions and objects is responsive to user input made by way of the user actually touching a particular object displayed on the screen, and thereby selecting that object.

Most commonly, that touch is by a user's finger. In computer devices which are designed to be portable, very often the screen area which is available for the object to be selected can be quite small, and as a consequence the objects can be quite close to each other. This can make it difficult for a finger (which may be relatively large as compared with the size of the object) to accurately select one particular object amongst a group of closely adjacent objects.

One particular context in which this arises is in the context of a computer game where a game board is displayed to a user which has adjacent selectable objects, for example in the form of letter tiles. In one game, the mechanic of the game is that a user should select a set of tiles in succession and thereby form words. The successful delivery of this game depends on the game application being able to accurately determine which of the letter tiles a user has selected. There can be some cases where a finger rests on the boundary of two or more tiles and this is difficult for the game application to reliably select which of the tile is intended to be selected by the user.

One such game is a game called Alphabetty available via the royal game website (www.royalgames.com). In this game, a user must select adjacent letters to form a word. When a word has been formed, the letters are automatically removed from the screen and letter tiles above the removed letters drop down. New letter tiles are provided to the screen from above to replenish the gaps now left by the tiles which have dropped down. In that sense, the game is a match-3 game similar to Candy Crush. When constructing a game application for installation on a mobile device with a smaller screen, the above referenced technical problems manifest themselves.

SUMMARY OF THE INVENTION

According to an aspect of the invention, there is provided a device having a touch user interface configured to display a game board having a plurality of selectable game objects comprising tiles stored in at least one memory and displayed in a configuration on said game board, each game object having a boundary defined on the user interface, said user interface being configured to receive user input, and at least one processor in connection or communication with the at least one memory and the user interface and configured to detect a selection of a game object in response to touch user input within the game object boundary, detect a trajectory of the user input towards neighbouring game objects, determine an angle of said trajectory with respect to an axis of the game board, and select at least one of the neighbouring game objects in dependence on said trajectory and determined angle.

According to another aspect there is provided a method of determining selection of game objects displayed on a device having a touch user interface configured to display a game board having a plurality of selectable game objects comprising tiles stored in at least one memory and displayed in a configuration on said game board, each game object having a boundary defined on the user interface, said user interface being configured to receive user input, and at least one processor in connection or communication with the at least one memory and the user interface, the method comprising detecting a selection of a game object in response to touch user input within the game object boundary, detecting a trajectory of the user input towards neighbouring game objects, determining an angle of said trajectory with respect to an axis of the game board, and selecting at least one of the neighbouring game objects in dependence on said trajectory and determined angle.

In an embodiment of the above aspects, the axis of the game board may be a horizontal axis.

In another embodiment the selection of at least one of the neighbouring game objects in dependence on said trajectory and determined angle may comprise providing a vector having the magnitude of the input trajectory and a direction corresponding to the angle formed with said axis.

In another embodiment, the determined angle may be compared against predefined angular regions to determine the selection of at least one of the neighbouring game objects. Optionally, the predefined angular regions may correspond to the game object tile configuration. For example, a Cartesian co-ordinate system may be applied to a game object configuration comprising a rectangular game board having square or rectangular game objects positions adjacent each other having predefined angular regions corresponding to cardinal directions of said configuration, for example N, NE, E, SE, S, SW, W, NW. The actual regions may be offset by a delta factor such as 22.5 degrees for example from the cardinal directions. This enables an intended trajectory to be determined by comparison with the region within which the trajectory falls.

In other embodiments, the gameboard may comprise a triangular or hexagonal game object configuration and hence may utilise a different co-ordinate system having different predefined regions with an appropriate offset delta factor.

In an embodiment the selection of at least one of the neighbouring game objects in dependence on said trajectory and determined angle may comprise providing a vector having a magnitude of input trajectory greater than a predefined threshold and a direction corresponding to the angle formed with said axis.

The predefined threshold may comprise the trajectory crossing a boundary of the neighbouring game object.

In some embodiments, the selected neighbouring object may then be utilised as the selected game object and the method aspects repeated, so as to provide a continuous selection of neighbouring game objects until input is no longer detected such as when the user removes or lifts a finger or pointer from the touchscreen user interface.

In yet another embodiment, at least one other game object may be selected for allocation of a new characteristic in dependence on the user input and a determined selection sequence of at least four tiles. Optionally the at least one other game object may be selected randomly.

Hence the selection of four or more game objects may be rewarded with the allocation of a new characteristic such as a bonus indicator to another game object not selected, with the future selection of that other game object providing the reward.

The new characteristic may comprise one or more of a variable indicating a portion of a target, or a booster.

The new characteristics may comprise boosters which may apply double or triple scores, or stars and/or other boosters to the allocated tile.

The booster may comprise, for example, a line blaster such that subsequent inclusion of the at least one other game object in a selection comprising a word also eliminates game object tiles in a row, column or both occupied by said at least one other game object.

In an embodiment, the allocation of said new characteristic may comprise a graphical representation such as for example a star or horizontal or vertical or both indicators on the at least one other object to indicate the new characteristic to the user or player on said user interface.

Hence in a tile based word game, the determination of a selection of tiles comprising four or more tiles may be rewarded by subsequently selecting at least one other game object imbued with the new characteristic activated by selection of the at least one other game object in a subsequent or future word selection.

In an embodiment, the at least one memory may store characteristics of the game objects, and may further store said new characteristics for allocation to game objects.

The characteristics of the game objects may comprise the game objects being letter tiles, having letters disposed thereon with a score associated with that letter.

The game objects may be distinguished or matched to other game objects by being coloured differently or sharing the same colour to alter the score, for example a yellow border on a tile may double the score awarded for a selected word including that tile, and a blue border on a tile may double the letter value of that tile included in a word score).

According to yet another aspect, there is provided computer readable storage device storing program code instructions that, when executed by at least one processor of a device having a touch user interface configured to display a game board having a plurality of selectable game objects comprising tiles stored in at least one memory and displayed in a configuration on said game board, each game object having a boundary defined on the user interface, said user interface being configured to receive user input, causes said at least one processor to perform the following steps: detect a selection of a game object in response to touch user input within the game object boundary, detect a trajectory of the user input towards neighbouring game objects, determine an angle of said trajectory with respect to an axis of the game board, and select at least one of the neighbouring game objects in dependence on said trajectory and determined angle.

According to another aspect, there is provided a program comprising program code instructions that, when executed by at least one processor of a device having a touch user interface configured to display a game board having a plurality of selectable game objects comprising tiles stored in at least one memory and displayed in a configuration on said game board, each game object having a boundary defined on the user interface, said user interface being configured to receive user input, causes said at least one processor to perform the following steps: detect a selection of a game object in response to touch user input within the game object boundary, detect a trajectory of the user input towards neighbouring game objects, determine an angle of said trajectory with respect to an axis of the game board, and select at least one of the neighbouring game objects in dependence on said trajectory and determined angle.

BRIEF DESCRIPTION OF DRAWINGS

To understand some embodiments, reference will now be made by way of example only to the accompanying drawings, in which.

DETAILED DESCRIPTION OF THE INVENTION

The inventors have recognised that touch control on touch sensitive displays on small portable devices such as mobile phones, smartphones or tablets can vary device to device since each device, and associated architecture and differing operating systems may have differing or limited input and processing power and touch input resolution.

Such realisations, coupled with a continuous input trail or trajectory of a users finger for example, can lead to erroneous selection of objects not intended to be selected by the user, leading to user frustration and disengagement.

The techniques described herein may be implemented in for instance a computer implemented tile based word game such as "Alphabetty™" of the applicant, which involves selecting game objects in the form of letter tiles to make words to score points against either a target or another player in a tournament or other multiplayer environment. Other examples include match-3 type games such as Candy Crush saga where a player ascends through a map of levels ("saga") to achieve objectives of the saga or quest game.

Figure 1:
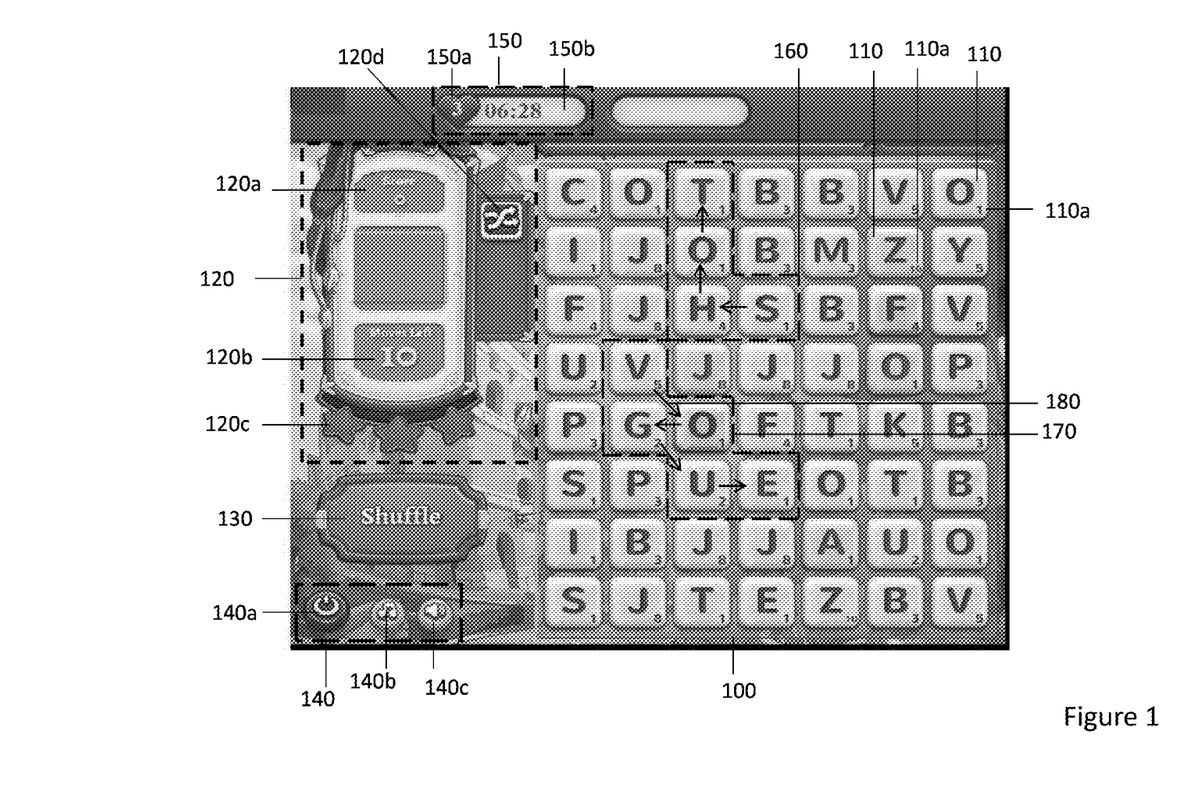
FIG. 1 shows an example embodiment of a game board.

FIG. 1 shows an example game board of a letter tile based computer implemented game according to an embodiment.

The game board 100 or playable area 100 is displayed upon which are disposed game objects 110. The game objects 110 in this embodiment comprise letter tiles which may have varying characteristics. The characteristics may be one or more of colour, shape, and/or different scores 110a per object or tile 110. In this embodiment, the objects 110 are square letter tiles arranged in a rectangular grid like fashion, although in other embodiments other game board configurations and other game object shapes or tiles may be utilized.

In some embodiments, the game may be implemented so that a level or a game session is completed when a certain target is reached by the user.

The target may comprise achieving a certain score by selecting tiles 110 to make words, each word scoring a total score at least in part in dependence on each of the individual tile scores 110a selected. The game can in some embodiments end if the player or user runs out of time 150b or moves 120b before managing to reach a designated target (not shown).

The game board 100 may have a number of game objects 110 having different characteristics 110a aligned in rows and columns, such as a 7×8 grid as shown in FIG. 1. Other grid sizes may be suitable. In such an embodiment the game objects on the game board have three, five or eight nearest or adjacent neighbouring game object tiles.

Other game board layouts or configurations may be provided. For example, triangular, pyramidal, hexagonal, octagonal or other layouts comprising position spaces or tiles within the game board 100 may be provided for display.

The game board 100 may be accompanied by a region 120 indicating a current score 120a and a number of moves remaining 120b as shown in the Figure.

There may also be provided control or optional actional items 130, 140, here shown as a shuffle control 130, and a game reset or off control 140a, music 140b and sound or volume control 140c.

The game board 100 may in some embodiments be accompanied by a region 150 indicating a timer or countdown 150b and a number of lives 150a remaining to the player.

The gameboard 100 shows region 160 in which a word may be formed. For example, region 160 indicates the word S-H-O-T being selected by individual selection of the game objects tiles 110, forming the word "shot" scoring a total of seven points. The forming of the word "shot" here involves only horizontal and vertical movement or selection via touch input.

Gameboard 100 of FIG. 1 also shows an example region 170 wherein the word "Vogue" is spelt. As can be seen, to create this word scoring 11 points, requires diagonal selection of neighbouring object tiles 100, as shown by arrow 180 indicated in figure.

The inventors have found that discriminating between diagonal 180 and vertical or horizontal adjacent neighbouring tiles can be problematic when dealing with touch input on devices with limited resources such as processing power, small display screens, and touch input resolution.

Figure 2:
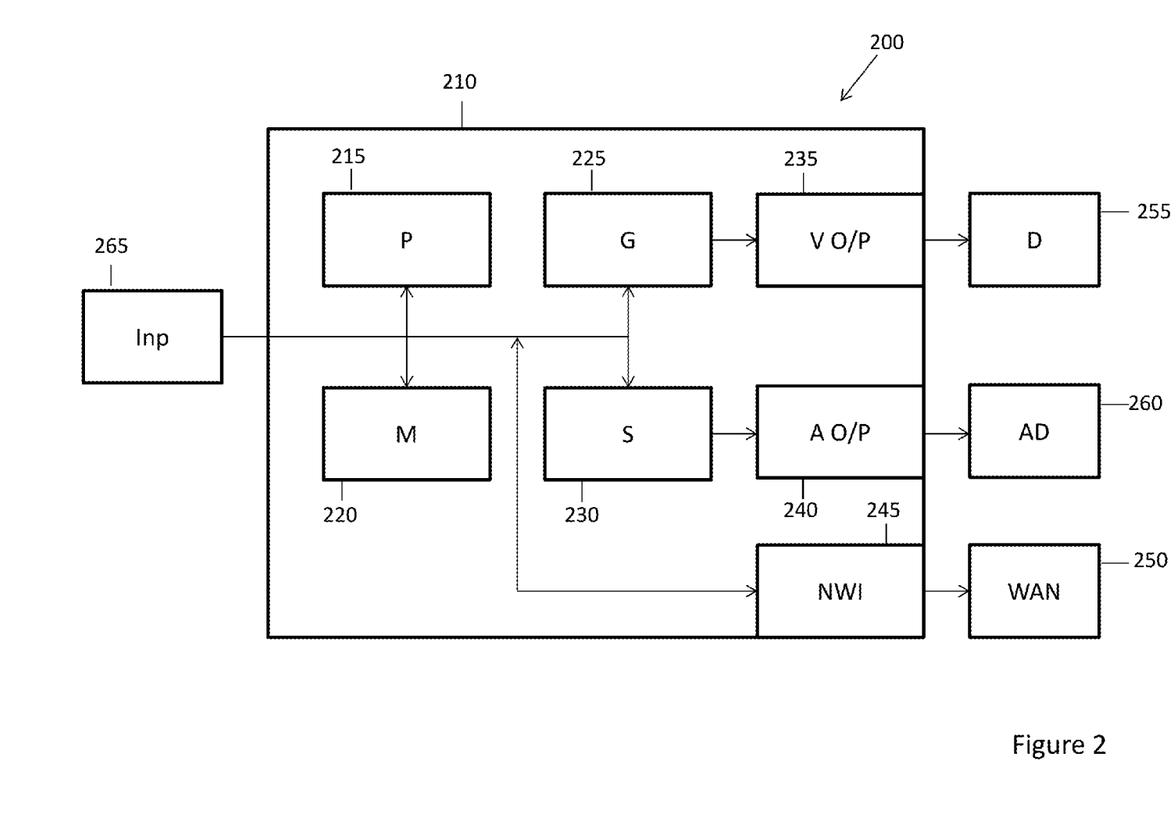
FIG. 2 shows an example user device in which some embodiments may be provided.

A schematic view of a user or computing device 200 according to an embodiment is shown in FIG. 2. All of the blocks shown are implemented by suitable circuitry. The blocks may be implemented in hardware and/or software. The user device may have a control part 210. The control part 210 has one or more processors 215 and one or more memories 220. The control part 210 is also shown as having a graphics controller 225 and a sound controller 230. It should be appreciated that one or other or both of the graphics controller 225 and sound controller 230 may be provided by the one or more processors 215.

The graphics controller 225 is configured to provide a video output 235. The sound controller 230 is configured to provide an audio output 240. The controller 210 has an interface 245 allowing the device to be able to communicate with a network 250 such as the Internet or other communication infrastructure.

The video output 235 is provided to a display 255. The audio output 240 is provided to an audio device 260 such as a speaker and/or earphone(s).

The device 200 has an input device 265. The input device 265 can take any suitable format and can be one or more of a keyboard, mouse, touch screen, joystick or game controller. It should be appreciated that the display 255 may in some embodiments also provide the input device 265 by way of an integrated touch screen for example.

The blocks of the controller 210 are configured to communicate with each other via an interconnect such as a bus or any other suitable interconnect and/or by point to point communication.

It should be appreciated that in some embodiments, the controller 210 may be implemented by one or more integrated circuits, at least in part.

The user device 200 is shown by way of example only. In alternative embodiments, one or more of the parts may be omitted. Alternatively or additionally, some embodiments may comprise one or more other parts. Alternatively or additionally, one or more parts may be combined.

Figure 3:
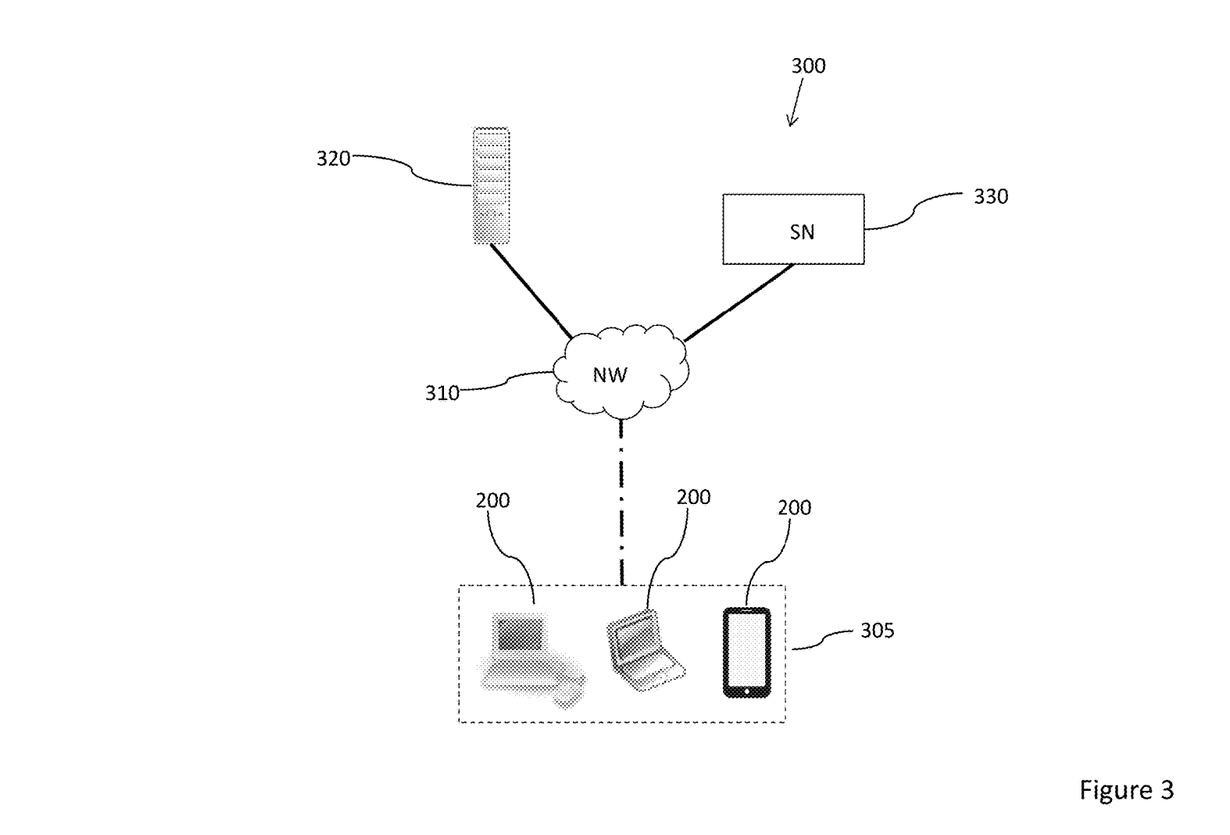
FIG. 3 shows an example system in which some embodiments may be provided.

FIG. 3 schematically shows a system 300 in some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory 220 of the user device 200 and is run on the processor 215 of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

Embodiments will now be described with reference to FIG. 4 and FIGS. 5a, and 5b.

Figure 4:
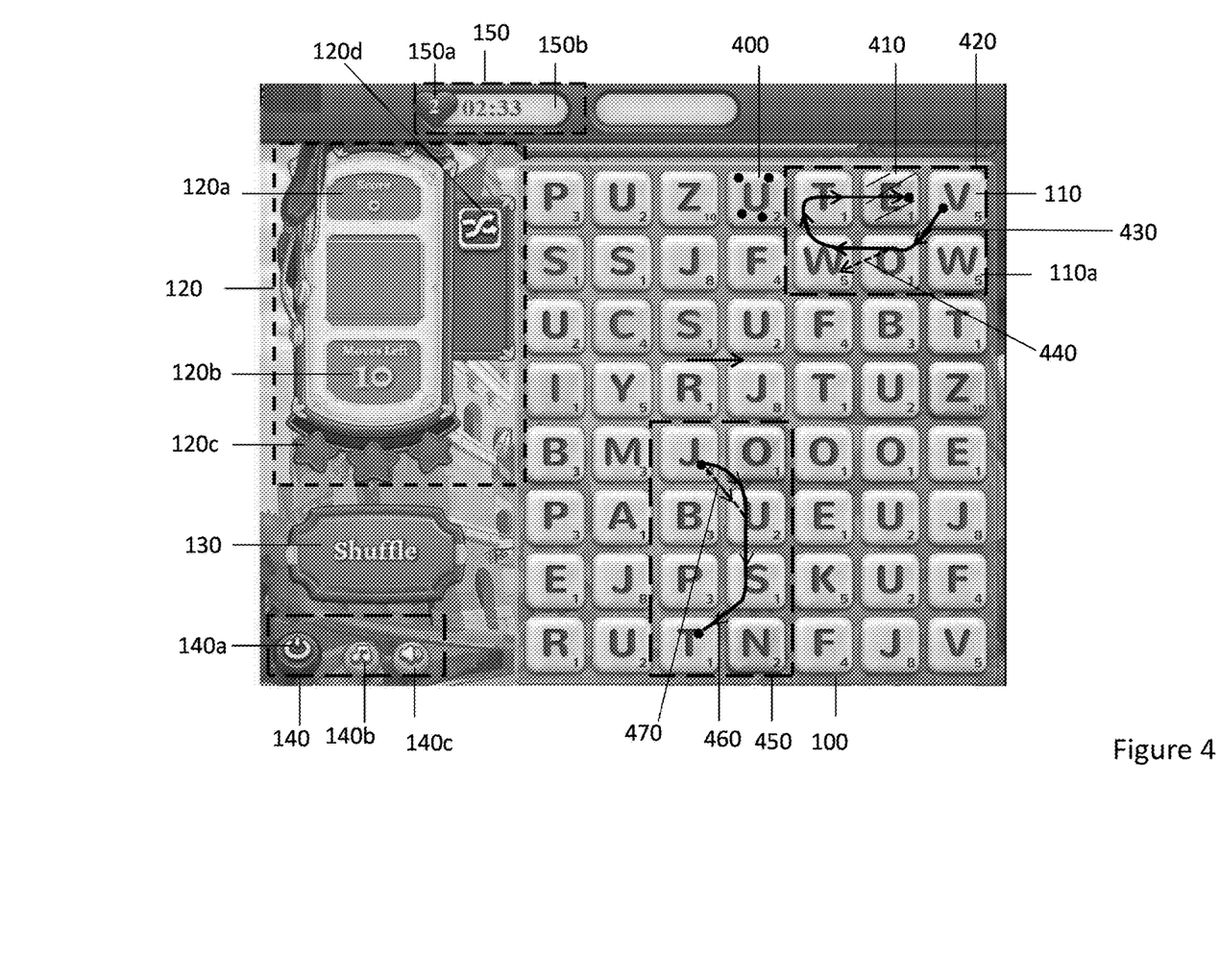
FIG. 4 depicts a gameboard according to some embodiments.

FIG. 4 shows an example game board 100 as per FIG. 1, comprising game objects 110. The Figure also shows an example of other game objects 400, 410. Other game object 410, depicted in the Figure as a letter tile "U" in the Figure, has a new characteristic in the form of a booster that will reward a user with a double score (indicated by the spots on the tile 400 in the Figure) should the game object 400 be included in a selection making a word. The other game object 410 has a new characteristic comprising a booster that indicates for example a line blaster characteristic (indicated by way of example only in the Figure by diagonal lines for clarity) which may eliminate all game objects sharing the same row (i.e. the first row of the game board 100 in the Figure) or column (i.e. the 6th column of the game board 100 in the Figure) or both. The allocation of such new characteristics to game objects 110 to create other game objects 400, 410 may be dependent on player input as will be described later.

FIG. 4 indicates potential word selections in areas 420 and 450 of the game board 100. Both areas have several words available for player input and selection. For example, the words "veto", "vote", "wow" and "wove" are possible selections in area 420, and the words "just", "joust" and "bust" are possible selections in area 450. The words "vote" and "vow" in area 420, and "just" and "joust" in area 450 of the game board 100 require similar trajectories 430, 440, 460, 470 corresponding to user input as shown in the Figure.

In particular, the inventors found discriminating between diagonal and adjacent neighbouring tiles problematic when dealing with touch input, which may follow a curved trajectory as shown 430, 460 rather than a straight trajectory 440, 470.

Embodiments of techniques enabling such discrimination will now be described with reference to FIGS. 5a, 5b and FIG. 6.

Figure 5A:
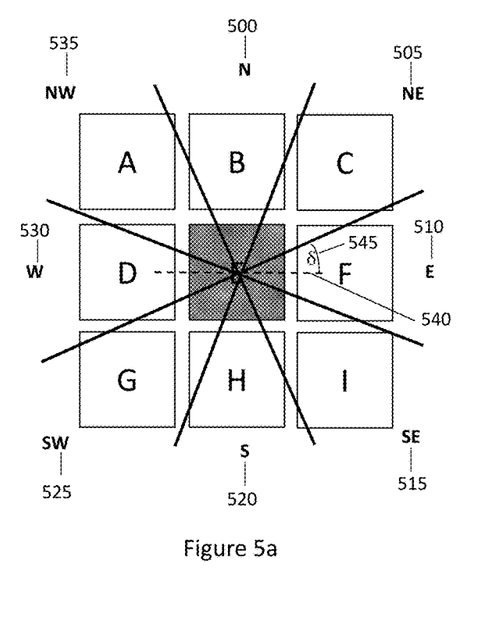
FIGS. 5a and 5b illustrate angular regions and an example determination according to an embodiment.

FIG. 5a illustrates, for simplicity, a 3×3 game object 110 area of a game board 100. A co-ordinate system comprising angular regions 500, 505, 510, 515, 520, 525, 530, 535 is provided, with an offset or delta value 545 in relation to an axis 540 of the game board, in this example the axis is shown as a horizontal axis but it may be defined, as may the angular regions in dependence on the game board 100 and game object tile 110 configuration or layout. This example corresponds to a rectangular game board 100 with square or rectangular game objects 110, but other co-ordinate systems may be chosen with differing offsets with respect to an axis of the game board.

In an embodiment, the offset or delta angle "d" 545 is 22.5 degrees. Hence, with reference to FIG. 5b, a continuous and perhaps wavering trajectory of input 550 which begins on a game object 110 such as the tile "C" and ends on tile "E" 570 in the Figure may be analysed tile by tile and broken into steps 560, 570 and a determination made as to each selection as follows with reference to FIG. 5b and FIG. 6.

Figure 5B:
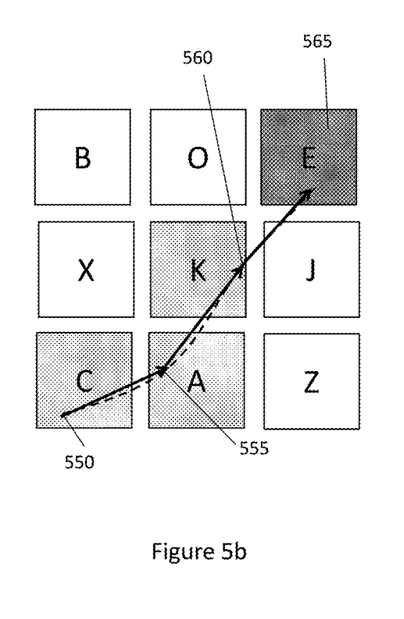
Figure 6:
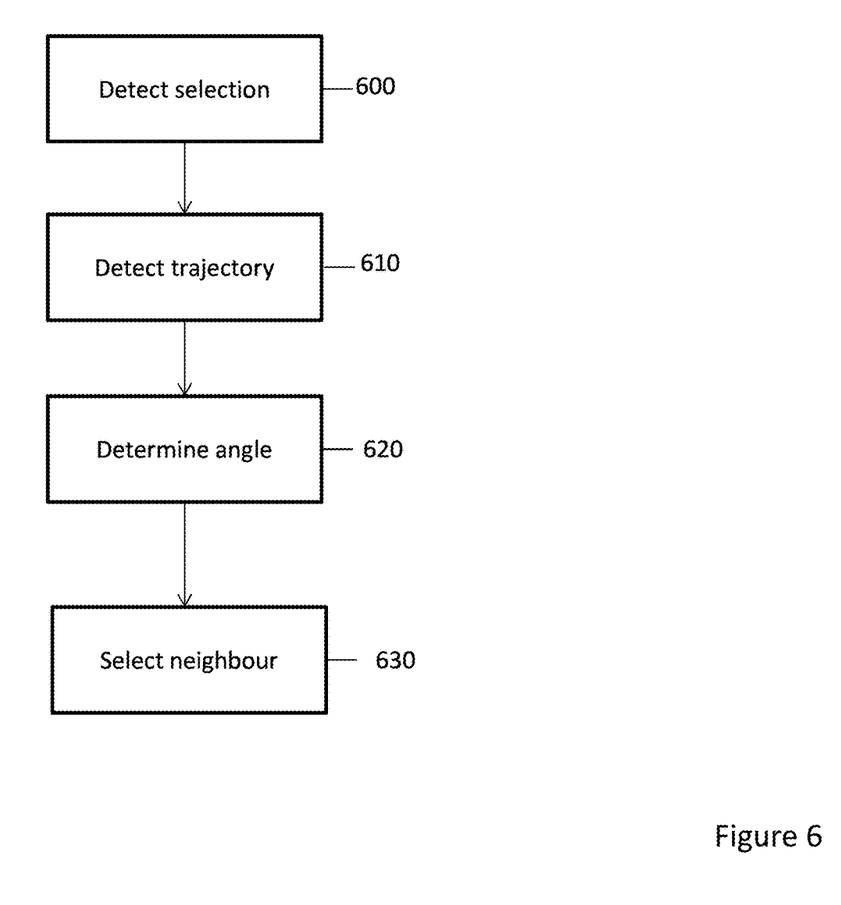
FIG. 6 is a flowchart depicting steps of a method according to an embodiment.

FIG. 6 illustrates steps of an embodiment of a method in which a detection of input selection at step 600 on a first game object 110, such as tile "C" 550 in FIG. 5b, is detected by user interface 255,265 of device 100. The input is then monitored by processor 215 and compared with a predefined threshold, such as for example in one embodiment the input crossing a boundary of a neighbouring game object 110. This results in the detection of a trajectory at step 610. The trajectory may then be stored in memory 220.

The processor 215 may then determine an angle of the trajectory with respect to the game board at step 620. The angle may be determined by smoothing or averaging the trajectory. The processor may then select a neighbouring game object 110 at step 630 by comparing the determined angle with the predefined angular regions 500, 505, 510, 515, 520, 525, 530, 535 and the angular region within which the determined angle falls determines the selection.

For example, with reference to FIG. 5b, the trajectory 560 from game object 110 "K" to game object 110 "E" traverses the boundary of game object "J". By monitoring input alone there could be ambiguity as to whether the user intended to select or highlight tile "E" or tile "J" from tile "K". However, a comparison of the determined angle of the trajectory 560 with the predefined angular regions unambiguously results in the angle falling within the angular region 505 "NE" (i.e. diagonal up to the right) and hence a reliable selection of the nearest neighbour "E" is processed.

This is regardless of where input on the first selected tile began, since the trajectory may only be recorded once the magnitude of that trajectory has exceeded a certain threshold.

In an embodiment, a vector of the trajectory determined when input crosses a boundary of a tile to indicate multiple or neighbour selection is created, and the direction of such a vector is determined by the angle formed with a reference axis of said game board. The selection of a nearest neighbour may then be further determined by comparing that angle with a predefined co-ordinate system having angular regions or sections themselves designed in part in dependence on the game board layout, with an appropriate delta or offset from the reference axis so as to cover appropriate selection directions on the game board.

Figure 7:
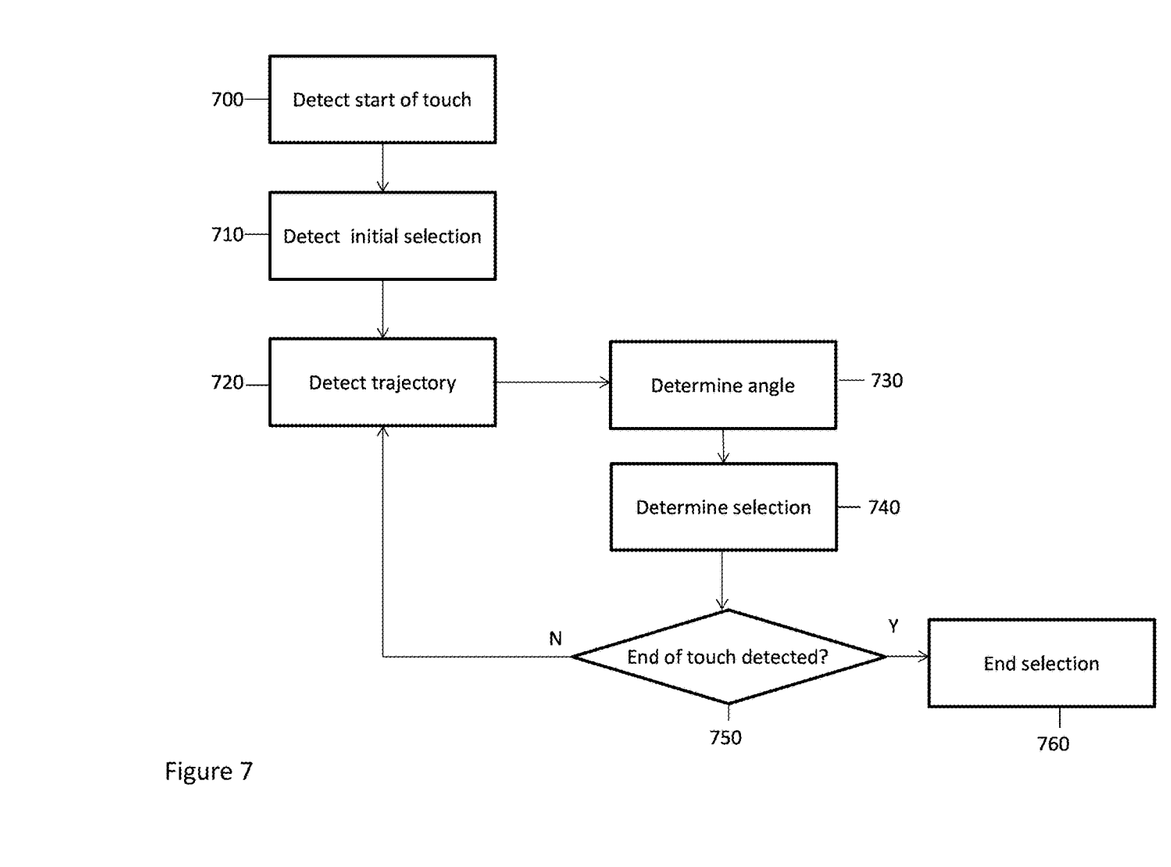
FIG. 7 is a flowchart depicting steps of a method according to another embodiment.

FIG. 7 illustrates another embodiment of a method which may resolve multiple game object 110 selections from a continuous input sequence.

In an embodiment processor 215 monitors user interface 255, 265 of device 200 and detects initial touch or "start of touch" input at step 700, and subsequently at step 710 detects an initial selection of the game object within which boundary the initial touch input resides. The input is then monitored by processor 215 and compared with a predefined threshold, such as for example in one embodiment the input crossing a boundary of a neighbouring game object 110. This results in the detection of a trajectory at step 720. The trajectory may then be stored in memory 220.

The processor 215 may then determine an angle of the trajectory with respect to the game board at step 730. The angle may be determined by smoothing or averaging the trajectory. The processor may then determine the selection of a neighbouring game object 110 at step 740 by comparing the determined angle with predefined angular regions 500, 505, 510, 515, 520, 525, 530, 535 and the angular region within which the determined angle falls.

The processor may then, at step 750, determine whether touch input has ended, or is still occurring. In the latter case, the processor loops back via the "N" branch of step 750 to step 720, where a new trajectory is detected starting from the previously determined selected game object. This loop may be repeated until no more input, i.e. "End of touch detected?"=Y at step 750 and the process may then subsequently terminate at step 760.

Hence, a continuous touch input spelling a word for example is broken down into trajectories per game object and selection determined as per the angular determination and angular region comparison.

Embodiments hence result in a low overhead, resource usage device and technique that may discriminate continuous game object selection in a predictable and stable manner, thus engaging the user.

In another embodiment, a continuous selection of four or more game objects or tiles using may cause said processor 213 to select at least one other game object 400 not forming part of the current selection for allocation of a new characteristic, and the at least one other game object 400 may be selected randomly in some variations.

Hence the selection of four or more game objects 110 may be rewarded with the allocation of a new characteristic such as a bonus indicator to another game object 400, 410, with the future selection of that other game object 400,410 providing the reward.

The new characteristic may comprise one or more of a variable indicating a portion of a target, or a booster.

The new characteristics may comprise boosters which may apply double or triple scores, or stars and/or other boosters to the allocated tile 400, 410.

The booster may comprise, for example, a line blaster such that subsequent inclusion of the at least one other game object 400, 410 in a selection comprising a word also eliminates game object tiles 110 in a row, column or both occupied by said at least one other game object.

In an embodiment, the allocation of said new characteristic may comprise a graphical representation such as for example a star or horizontal or vertical or both indicators on the at least one other object 400, 410 to indicate the new characteristic to the user or player on said user interface.

Hence in a tile based word game, the determination of a selection of words comprising four or more tiles 110 may be rewarded by subsequently selecting at least one other game object 400, 410 imbued with the new characteristic activated by selection of the at least one other game object 400, 410 in a subsequent or future word selection.

In an embodiment, the at least one memory 265, 320 may store characteristics of the game objects 110, and may further store said new characteristics for allocation to other game objects 400, 410.

Hence game mechanics which may encourage engagement and completion of a level or game board are provided utilising the input embodiments described herein.

Some embodiments may allow for synchronisation of for example game states between different devices or platforms.

The game may for instance be played in an offline mode on a handheld device 200, 305 using locally stored information on the handheld device 200, 305. The device may store all or some of the levels that are available as applicable to the particular game and its saga or mission objectives. Some of the features may be locally executed on the device 200, 305. This may for instance implement a scheme to regenerate lives after a certain period of time, the time may be locally decided based on the clock on the device 200, 305. In some embodiments, the central game server 320 clock may override the local clock when the local device 200 has been synchronised with the server 320.

Some embodiments may be implemented to synchronize game state information 120, 150 and/or retrieve and connect to social graph information and user profile data on a social network 330 such as Facebook or Google+.

Some embodiments may be implemented to enable connection to a plurality of social networks 330. The user may be given the option to select which information may be derived and/or shared with which social network 330.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

It is also noted herein that there are several variations and modifications which may be made to the disclosed solution without departing from the scope of the present disclosure.

The invention claimed is:

1. A device having a touch user interface configured to display a game board having a plurality of selectable game objects comprising tiles stored in at least one memory and displayed in a configuration on said game board, each game object having a boundary defined on the user interface, said user interface being configured to receive user input from a user, and at least one processor in connection or communication with the at least one memory and the user interface and configured to:
   detect a selection of a first game object in response to touch user input within a game object boundary of the first game object,
   detect touch user input within a game object boundary of a second game object neighboring the first game object; and
   detect touch user input within a game object boundary of a third game object neighboring the first game object;
   detect a trajectory of the user input in response to the user input traversing the first, second and third game objects,
   determine an angle of said trajectory with respect to an axis of the game board, and
   use the determined angle of the trajectory to determine a selection of one of the second game object and the third game object following the selection of the first game object, and
   accordingly select one of the second game object and the third game object.

2. A device according to claim 1, wherein the axis of the game board is a horizontal axis.

3. A device according to claim 1, wherein the determined angle of the trajectory comprises providing a vector having a magnitude of input trajectory greater than a predefined threshold and a direction corresponding to the angle formed with said axis.

4. A device according to claim 3, wherein the predefined threshold comprises the trajectory crossing the boundary of the first or second game object.

5. A device according to claim 3, wherein further game objects are selected based on the vector magnitude.

6. A device according to claim 1, wherein the determined angle is compared against predefined angular regions to determine the selection of at least one of one of the second game object and the third game object.

7. A device according to claim 6, wherein the predefined angular regions correspond to the game object tile configuration, the regions having an associated offset delta value.

8. A device according to claim 1, wherein the configuration of the game board comprises a rectangular configuration.

9. A device according to claim 8, wherein the determined angle is compare against predefined angular regions to determine the selection of one of the second game object and the third game object, wherein the predefined angular regions correspond to the game object tile configuration, the regions having an associated offset delta value, wherein the predefined angular regions correspond to cardinal directions of said configuration.

10. A device according to claim 9, wherein the delta value is 22.5 degrees.

11. A device according to claim 1, wherein at least one other game object is selected for allocation of a new characteristic in dependence on the user input and determined selection of at least four tiles.

12. A device according to claim 11, wherein the at least one other game object is selected randomly.

13. A device according to claim 11, wherein the new characteristic comprises one or more of a variable indicating a portion of a target, or a booster.

14. A device according to claim 13, wherein the booster comprises a line blaster.

15. A device according to claim 11, wherein the allocation of said new characteristic comprises a graphical representation of said indication displayed on said at least one other game object.

16. A device according to claim 11, wherein the at least one memory stores said new characteristics for allocation to other game objects.

17. A method of determining selection of game objects displayed on a device having a touch user interface configured to display a game board having a plurality of selectable game objects comprising tiles stored in at least one memory and displayed in a configuration on said game board, each game object having a boundary defined on the user interface, said user interface being configured to receive user input from a user, and at least one processor in connection or communication with the at least one memory and the user interface, the method comprising:
  detecting by the processor a selection of a first game object in response to touch user input within a game object boundary of the first game object,
  detecting by the processor touch user input within a game object boundary of a second game object neighboring the first game object; and
  detecting by the processor touch user input within a game object boundary of a third game object neighboring the first game object;
  detecting by the processor a trajectory of the user input in response to the user input traversing the first, second and third game objects,
  determining by the processor an angle of said trajectory with respect to an axis of the game board, and
  using, by the processor, the determined angle of the trajectory to determine a selection of one of the second game object and the third game object following the selection of the first game object, and
  accordingly selecting, by the processor, one of the second game object and the third game object.

18. A method according to claim 17, wherein the axis of the game board is a horizontal axis.

19. A method according to claim 17, wherein the determined angle of the trajectory comprises providing a vector having a magnitude of input trajectory greater than a predefined threshold and a direction corresponding to the angle formed with said axis.

20. A method according to claim 19, wherein the predefined threshold comprises crossing a boundary of the second game object or third game object.

21. A method according to claim 17, wherein the determined angle is compared by the processor against predefined angular regions to determine the selection of one of the second game object and third game objects.

22. A method according to claim 21, wherein the predefined angular regions correspond to the game object tile configuration, the regions having an associated offset delta value.

23. A method according to claim 22, wherein the predefined angular regions correspond to cardinal directions of said configuration offset by said delta value.

24. A method according to claim 23, wherein the delta value is 22.5 degrees.

25. A non-transitory computer readable storage device storing instructions that, when executed by at least one processor of a device having a touch user interface configured to display a game board having a plurality of selectable game objects comprising tiles stored in at least one memory and displayed in a configuration on said game board, each game object having a boundary defined on the user interface, said user interface being configured to receive user input from a user, causes said at least one processor to perform the following steps:
  detect a selection of a game object in response to touch user input within the game object boundary of the first game object,
  detect touch user input within a game object boundary of a second game object neighboring the first game object; and
  detect touch user input within a game object boundary of a third game object neighboring the first game object;
  detect a trajectory of the user input in response to the user input traversing the first, second and third game objects,
  determine an angle of the trajectory with respect to an axis of the game board, and
  use the determined angle of the trajectory, to determine a selection of one of the second game object and the third game object following the selection of the first game object, and
  accordingly select one of the second game object and the third game object.

* * * * *